(12) United States Patent
Yu et al.

(10) Patent No.: US 11,057,549 B2
(45) Date of Patent: Jul. 6, 2021

(54) TECHNIQUES FOR PRESENTING VIDEO STREAM NEXT TO CAMERA

(71) Applicant: Lenovo (Singapore) Pte. Ltd., Singapore (SG)

(72) Inventors: Jonathan Jen-Wei Yu, Raleigh, NC (US); Aaron M. Stewart, Raleigh, NC (US); Lincoln Penn Hancock, Raleigh, NC (US); Jeffrey Earle Skinner, Raleigh, NC (US); Alden Rose, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 55 days.

(21) Appl. No.: 16/543,225

(22) Filed: Aug. 16, 2019

(65) Prior Publication Data

US 2021/0051245 A1 Feb. 18, 2021

(51) Int. Cl.
*H04N 5/225* (2006.01)
*H04N 5/232* (2006.01)

(52) U.S. Cl.
CPC ......... *H04N 5/2253* (2013.01); *H04N 5/2252* (2013.01); *H04N 5/2254* (2013.01); *H04N 5/2257* (2013.01); *H04N 5/23222* (2013.01)

(58) Field of Classification Search
CPC .. H04N 5/2253; H04N 5/2252; H04N 5/2254; H04N 5/2257; H04N 5/23222; H04N 5/23216; H04N 7/142; H04N 7/144; H04L 41/22
See application file for complete search history.

(56) References Cited

U.S. PATENT DOCUMENTS

| 5,815,197 | A  | * | 9/1998  | Kakii    | H04N 7/142  |
|           |    |   |         |          | 348/14.16   |
| 9,942,513 | B1 | * | 4/2018  | Aarrestad | H04N 7/142 |
| 2003/0058363 | A1 | * | 3/2003 | Boyden | H04N 7/144 |
|           |    |   |         |          | 348/375     |
| 2010/0306650 | A1 | * | 12/2010 | Oh    | G06F 3/04883 |
|           |    |   |         |          | 715/702     |
| 2012/0274735 | A1 | * | 11/2012 | Byers | H04N 7/144 |
|           |    |   |         |          | 348/14.16   |
| 2018/0077384 | A1 | * | 3/2018  | Goldman | H04N 7/142 |

* cited by examiner

*Primary Examiner* — Nhan T Tran
(74) *Attorney, Agent, or Firm* — John M. Rogitz; John L. Rogitz

(57) ABSTRACT

In one aspect, a device includes at least one processor and storage accessible to the at least one processor. The storage includes instructions executable by the at least one processor to identify coordinates of a camera relative to a screen and to present on the screen a video stream next to the coordinates responsive to identifying the coordinates of the camera.

20 Claims, 9 Drawing Sheets

US 11,057,549 B2

TECHNIQUES FOR PRESENTING VIDEO STREAM NEXT TO CAMERA

FIELD

The present application relates to technically inventive, non-routine solutions that are necessarily rooted in computer technology and that produce concrete technical improvements.

BACKGROUND

As recognized herein, video feeds of remote users and device settings in software are not proximal to the webcam, which is a proxy for eye contact when video chatting. This leads to people looking disengaged, and non-verbal communication not translating well when speaking or listening. As understood herein, current webcams and devices are not tied to the software through a graphical user interface (GUI), with the settings and video previews embedded into the computer or phone settings.

There are currently no adequate solutions to the foregoing computer-related, technological problem.

SUMMARY

Accordingly, in one aspect a device includes at least one processor and storage accessible to the at least one processor. The storage includes instructions executable by the processor to identify coordinates of a camera relative to a screen, and responsive to identifying the coordinates of the camera, present on the screen a video object of interest (VOI) in a video stream next to the coordinates.

In examples, the camera is coupled to the screen. In some embodiments, the camera is coupled to the screen by a suction cup. In other embodiments, the camera is coupled to the screen by a bezel of the screen. Or, the camera may be coupled to the screen by an articulating arm. Yet again, the screen may be an organic light emitting diode (OLED) screen and the camera may be mounted on a side of the screen opposite a view side of the screen.

In some embodiments, the coordinates are first coordinates and the instructions can be executable to identify second coordinates of the camera relative to the screen pursuant to relocation of the camera, and responsive to identifying the second coordinates of the camera, move the VOI next to the second coordinates.

In another aspect, a computer readable storage medium (CRSM) that is not a transitory signal includes instructions executable by at least one processor to detect a first location of a camera relative to a video screen, juxtapose a video object of interest (VOI) with the first location, detect a second location of the camera relative to the video screen, and juxtapose the VOI with the second location.

In another aspect, a method includes identifying x-y coordinates of a camera imaging a local user relative to a local device. The method also includes receiving a video stream from a remote computer. The video stream includes a video object of interest (VOI). The method includes, responsive to identifying the x-y coordinates of the camera imaging the local user, presenting the VOI adjacent the x-y coordinates on a screen of the local device.

The details of present principles, both as to their structure and operation, can best be understood in reference to the accompanying drawings, in which like reference numerals refer to like parts, and in which:

DETAILED DESCRIPTION

Figure 1:
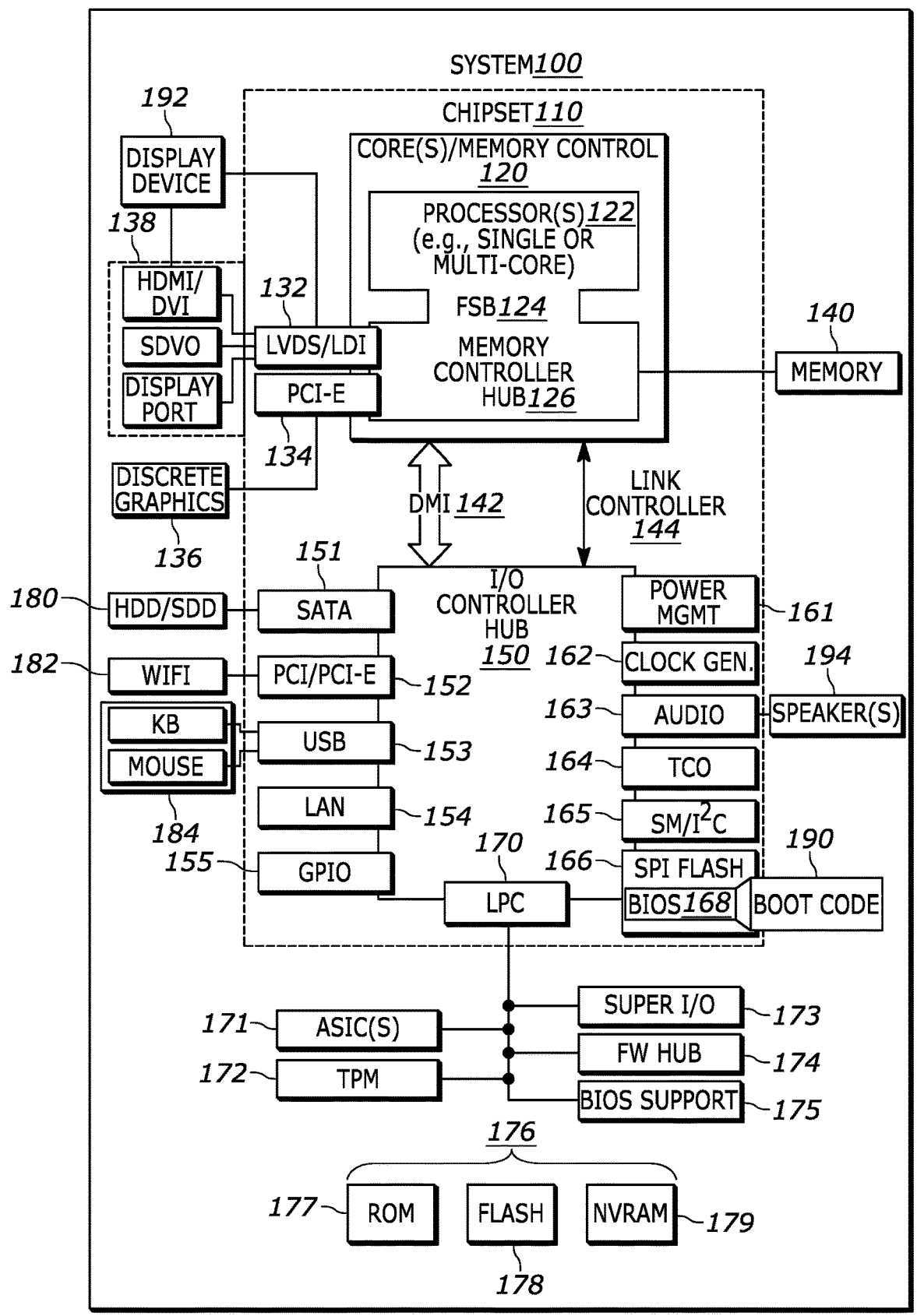
FIG. 1 is a block diagram of an example system consistent with present principles.

In accordance with present principles, a webcam or other camera may be enabled to give users better adjustability to enable more realistic eye contact on the receiving end and better integration with a UI via hardware sensors that detect a position of camera relative to a display. The camera or related device may detect the camera's location on or near the display and place a video feed of remote participants visually proximal to the camera location to emulate eye contact. The may UI indicate a visual "link" to hardware, a number of remote attendees, and other variables such as active speaker or status. Sensor information may be used to best arrange video icons emanating from the camera based on available visual space on screen. The system can detect the location using sensors either embedded in the display or camera.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C # or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
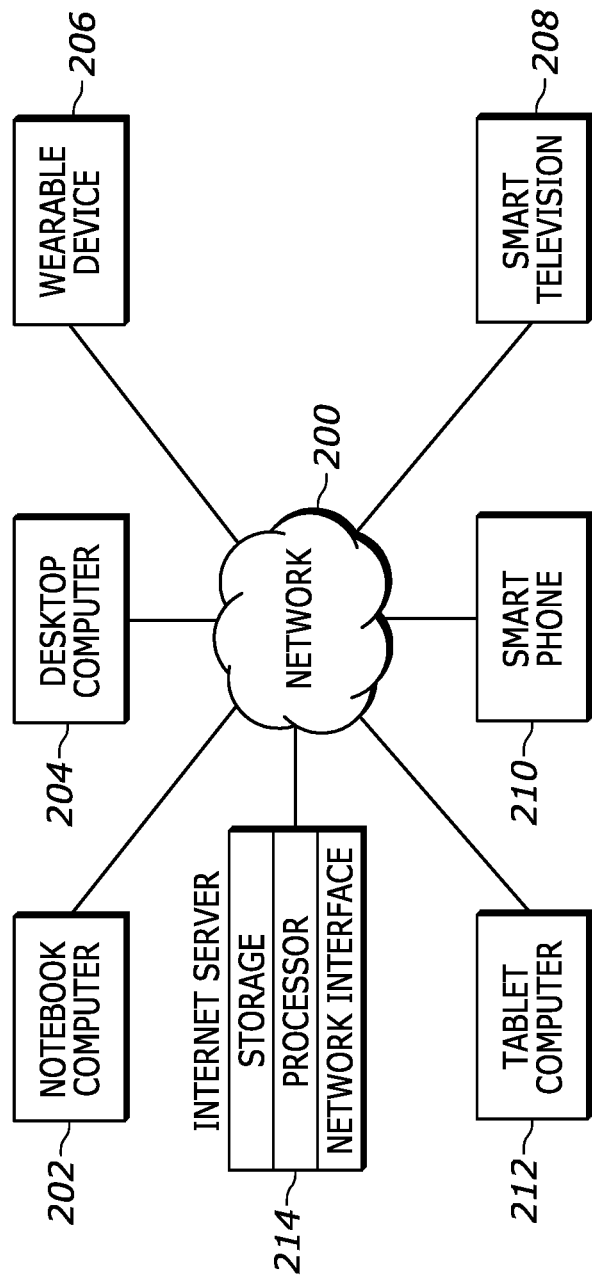
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
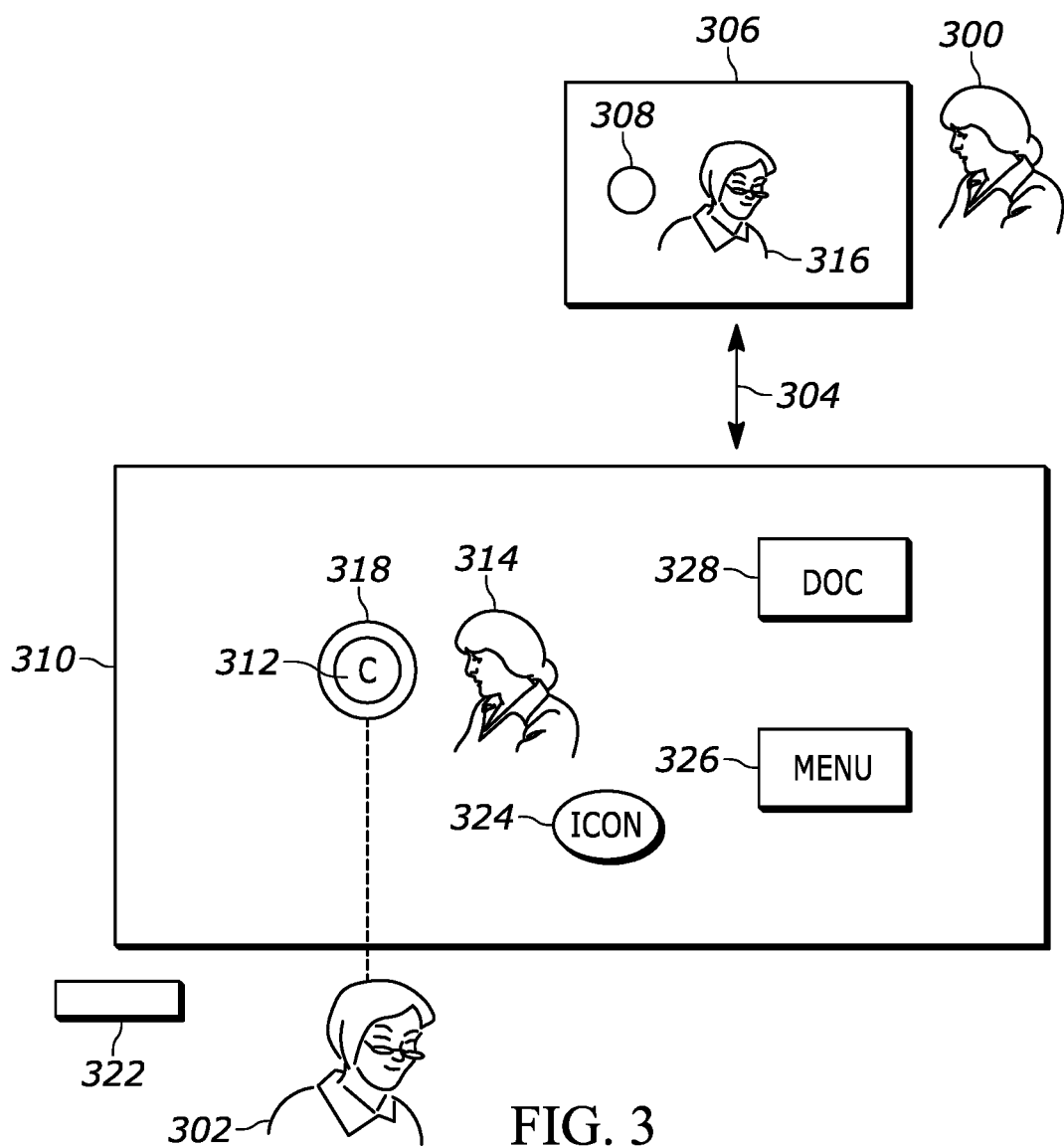
FIG. 3 is a schematic diagram illustrating a computer network-enabled video conference consistent with present principles.

FIG. 3 schematically illustrates present principles using a first example embodiment. In FIG. 3, a remote user 300 is conducting a video conference with a local user 302 over a computer network 304 such as the Internet, it being understood that attendant network components such as servers, switches, etc. are omitted for clarity. The remote user views a remote computer device 306, which may include a remote camera 308 for imaging the remote user 300. The local user 302 views a local computer device 310, which may include a local camera 312 for imaging the local user 302. An image 314 of the remote user 300 is received by the local computer 310 and presented thereon. Likewise, an image 316 of the local user 302 is received by the remote computer 306 and presented thereon. The cameras herein may be battery-powered if desired. The cameras herein may be provided with buttons that can be manipulated to cause the devices to present camera settings UIs.

As will be appreciated in light of the above description and looking at FIG. 3, the local computer 310 presents the image 314 of the remote user 300 next to the local camera 312, the location of which on the local computer 310 is determined using any of the methods described further below, so that the local computer 310 knows where the local camera 312 is and can place the image 314 of the remote user 300 next to it. Likewise, the remote computer 306 presents the image 316 of the local user 302 next to the remote camera 308, the location of which on the remote computer 306 is determined using any of the methods described further below, so that the remote computer 306 knows where the remote camera 308 is and can place the image 316 of the local user 302 next to it. In this way, both users 300, 302 appear to be looking substantially directly at their respective cameras 308, 312 while viewing the images 316, 314 of the counterpart user.

Should the local user 302 decide to move the location of the local camera 312 on the screen of the local computer 310, it is to be understood that the local computer 310 moves the image 314 of the remote user 300 accordingly, i.e., that the video image of the remote user is moved to be located next to the location of the local camera 312. Note, however, that the image 314 is presented on the screen of the local computer 310 so that, while it is next to the camera 312, it does not overlap the screen area on which the camera 312 is located, and thus is not obscured by the camera 312.

Figure 4:
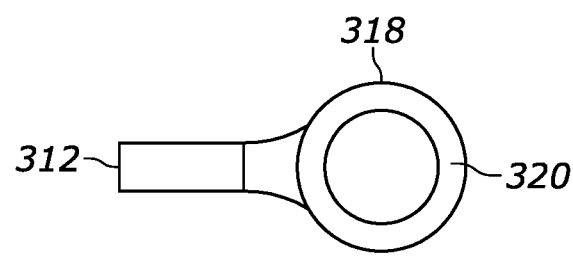
FIG. 4 illustrates a suction cup for engaging the local camera with the local device.

In the example shown in FIG. 3, the local camera 312 is attached to a suction cup 318 to removably adhere the local camera 318 to the screen of the local computer 310. When the screen is a touch screen, as shown in FIG. 4 the suction cup 318 may include a screen adhesion surface 320 that is capacitive, e.g., that is covered with a capacitive film, so that its presence (and, hence, screen coordinates) is detected by the local computer 310 using touchscreen sensing. Note that generally as used herein, "coordinates" or "screen coordinates" refers to x-y coordinates that define a point or points on the plane of the screen, and typically do not involve z-dimension coordinates, i.e., coordinates along the dimension normal to the plane of the screen.

In an embodiment, the local computer 310 may distinguish a touch signal from the suction cup 318 from a finger by, e.g., identifying that an annular pattern of touch of the suction cup as opposed to a continuous circle of touch from a finger. Time periods may also or alternatively be used, e.g., a touch that lasts a short period may be inferred to be a finger touch and a touch that lasts a longer period (more than a threshold) may be inferred to correspond to the location of the suction cup.

Returning briefly to FIG. 3, in an alternate embodiment such as a non-touch screen embodiment, a secondary camera 322 that communicates with the processor of the local computer 310 may image the screen of the local computer 310 along with the local camera 312 and other surroundings, providing the image to the local computer 310, which can determine the location of the local camera 312 on the screen of the local computer 310 using image recognition. The secondary camera 322 may be provided on the local camera 312 if desired.

Alternate techniques for identifying the screen coordinates of the local camera 312 include near field detection, e.g., the camera 312 may include a near field communication (NFC) tag on it that may be read by an NFC reader on the local computer 310. Another alternate technique for identifying the screen coordinates of the local camera 312 include providing the camera with a global positioning satellite (GPS) receiver or other position receiver to determine the absolute coordinates of the camera, with the camera location data being sent from the camera 312 to the local computer 310 for use by the local computer 310 in identifying the screen coordinates of the camera, it being understood that the local computer 310 likewise identifies its own location and that of its screen using GPS or other position receiver.

Still referring to FIG. 3, in addition to presenting the video image 314 of the remote user 300 on the screen of the local computer 310 next to the local camera 312, the local computer 310 may execute logic to place other video conference objects such as an icon 324, menu 326, and document 328 on the screen of the local computer 310 such that the other objects do not obscure the image 314 nor are they obscured by the camera 312.

It is to be understood that while FIG. 3 assumes that the local user 302 will typically view, primarily, the video image 314 of the remote user 300 and hence that the video image 314 should be placed next to the camera 312, with the other objects 324, 326, 328 being located on portions of the screen occupied by neither the image 314 nor camera 312, it may be desirable to move one of the other objects closest to the camera and move the video image 314 further away, if the local user 302 intends to look primarily at one of the other objects. This may be done automatically. For instance, using eye tracking on the image of the local user 302 taken by the local camera 312, the local computer 310 may determine that the local user 302 spends a majority of the time looking at the document 328. In such a case, the screen positions of the document 328 and video image 314 of the remote user 300 may be swapped automatically.

Figure 5:
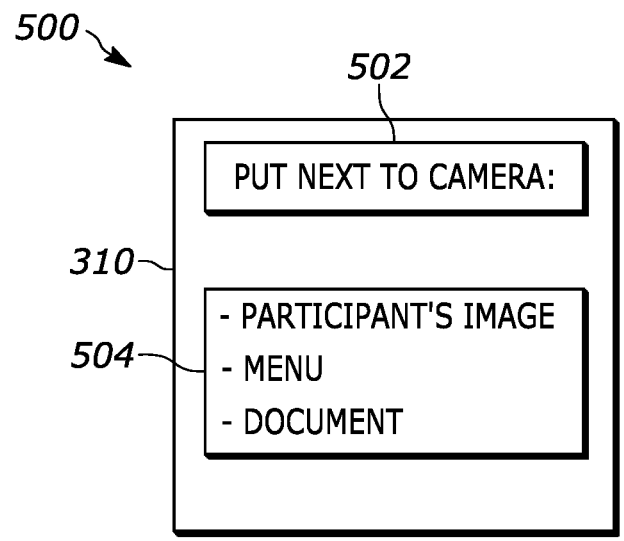
FIGS. 5 and 6 are screen shots of example user interfaces (UI)

Or, the local user may be afforded the opportunity to determine what object to place next to the camera 312. FIG. 5 illustrates. As shown, a user interface (UI) 500 may be presented on the local computer 310 that includes a prompt 502 to use one of the selectors 504 to select which corresponding video object to place next to the camera.

Figure 6:
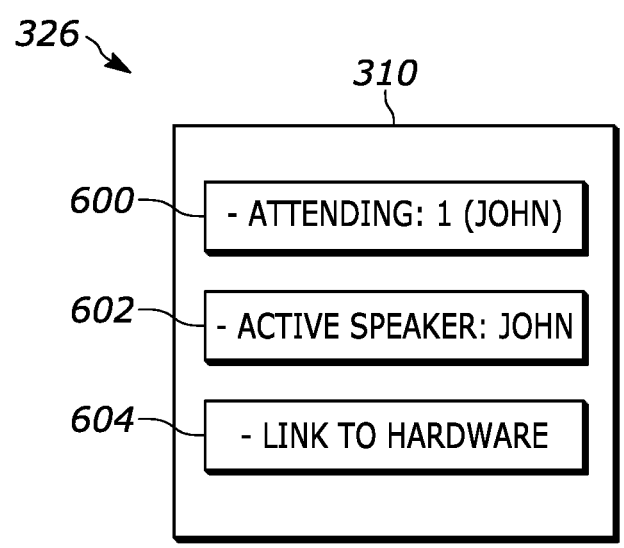

FIG. 6 illustrates an example embodiment of the menu 326 in FIG. 3. The menu 326 may indicate a number 600 of remote attendees (with names if desired), other variables 602 such as active speaker or status, and a visual "link" to hardware 604. Filters may be provided on the menu, such as image 314 brightness, cropping, and auto-follow.

Figure 7:
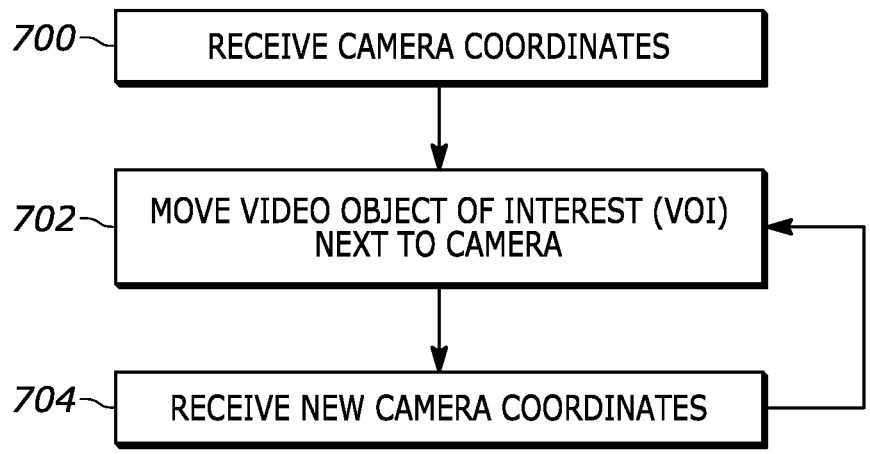
FIGS. 7 and 8 are flow charts of example logic consistent with present principles.

FIG. 7 illustrates example overall logic. Note that while FIG. 7 and other flow charts may illustrate logic in flow chart format, state logic or other equivalent logic may be used. The logic of FIG. 7 may be implemented by a user device, a network server in communication with the network device, a third-party consumer electronics device such as a camera, and combinations thereof.

Commencing at block 700, the coordinates of the camera are identified using, e.g., any of the techniques described herein. Proceeding to block 702, the video object of interest (VOI) such as the image 314 is presented on the screen of the computer next to the camera coordinates but not overlapping the coordinates in many embodiments. By "next to" is meant closer to the camera coordinates than other video objects (and even all other presented objects) are presented, or alternatively closer to the camera coordinates than the location the VOI would otherwise be presented using the raw video feed from the remote device 306. "Next to" may also include a proximate border of the VOI being presented at a threshold screen distance from the camera coordinates relative to a center or proximal outer point of the camera coordinates, such as the proximate border of the VOI being presented one inch beyond an adjacent border defined by the camera coordinates.

Block 704 indicates that new camera coordinates may be received pursuant to, e.g., the local user 302 moving the camera 312 on the screen of the local computer 310, in which case the logic loops back to block 702 to move the screen coordinates of the VOI to be close to the new coordinates of the camera.

Figure 8:
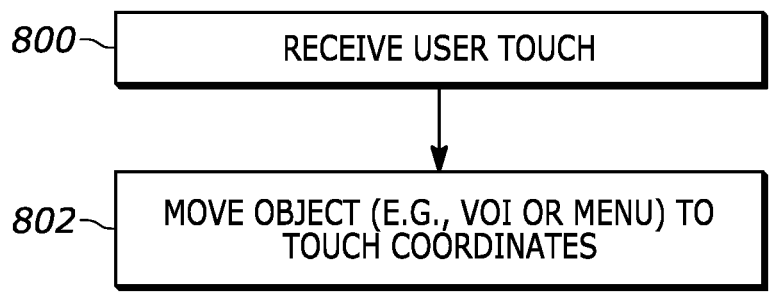

FIG. 8 indicates that a user touch may be received on, e.g., a touch screen of the local device 310. In lieu of a user touch, a screen cursor may be moved using, e.g., a mouse and then a select signal (mouse click) may be entered to input the coordinates of the screen cursor. Moving to block 802, an object such as the VOI or the menu 326 may be moved to the location of the touch or the mouse click. In this way, the user can dictate whether the VOI, for example, is presented just above the camera, just to the right of the camera, etc.

Figure 9:
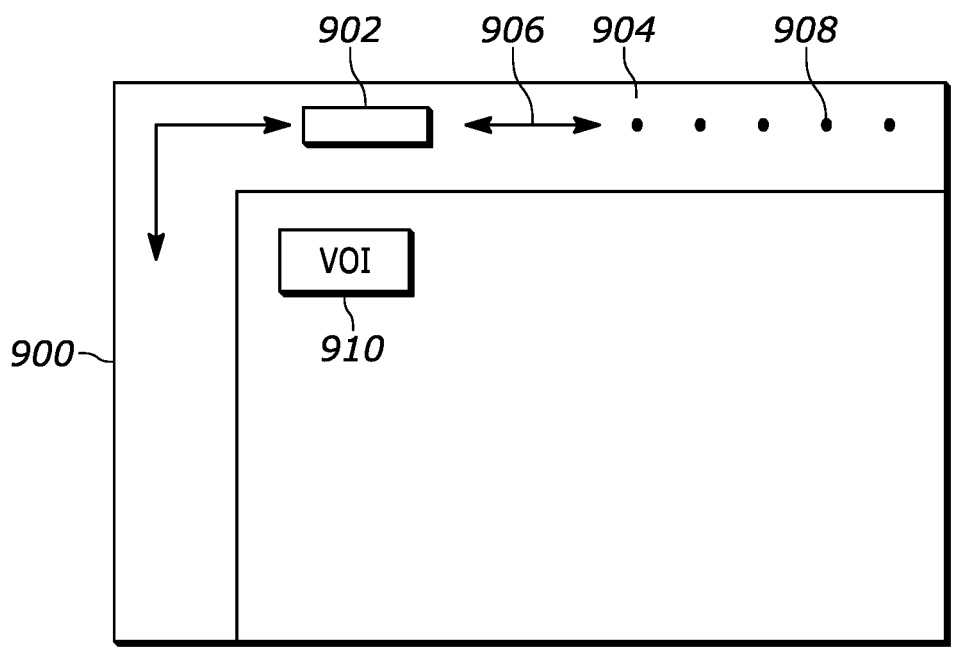
FIGS. 9-12 are schematic diagrams of alternate embodiments consistent with present principles.

FIG. 9 illustrates an alternate embodiment in which a local computer 900 includes a local camera 902 that is in all essential respects identical to the local computer and camera shown in FIG. 3, with the following exceptions. In FIG. 9 the camera 902 slides along a bezel 904 of the display and may slide along both a horizontal portion of the bezel and a vertical portion of the bezel as indicated by the arrows 906. The camera 902 may slide based on a user pushing it or otherwise moving it to slide it, and/or the camera 902 may be moved electronically using a motor in the bezel 904 under control of the local computer 900 itself to move to the camera 902 to adjacent to a screen location at which the VOI 910 can be presented without obscuring or moving other objects that might also be presented on the screen such as an unrelated music streaming application UI. Sensors 908 in the bezel 904 may detect the coordinates of the camera 902 or the location to which the camera 902 is moved may already be known/mapped based on the camera 902 being moved under control of the computer 900 itself. The sensors 908 may be, without limitation, pressure sensors or capacitive sensors. The VOI 910 may thus be presented next to the location of the camera 902.

Figure 10:
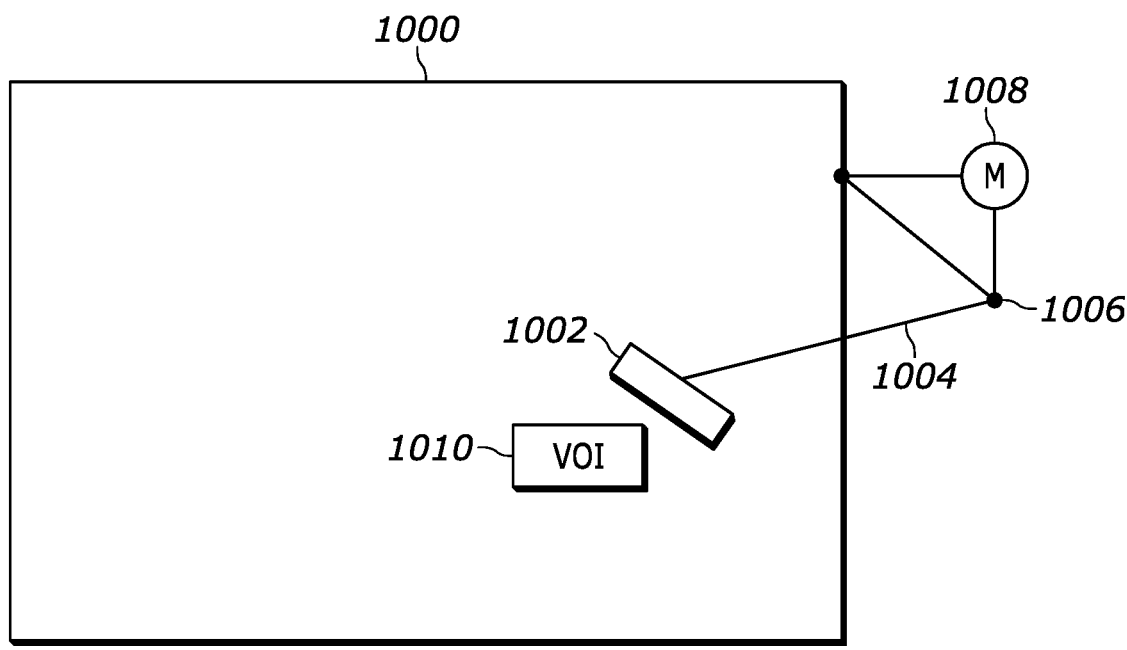

FIG. 10 illustrates an alternate embodiment in which a local computer 1000 includes a local camera 1002 that is in all essential respects identical to the local computer and camera shown in FIG. 3, with the following exceptions. In FIG. 10 the camera 1002 is connected to an articulating arm or boom 1004 that in turn is coupled to the device 1000 via one or more motion joints 1006. The arm or boom 1004 may be moved manually by the user to position the camera or it may be moved robotically using, e.g., one or more motors 1008. The coordinates of the camera 1002 may be sensed using NFC or image recognition or capacitance or other techniques described herein, and the VOI 1010 is presented next to the (x-y) location of the camera 1002.

Figure 11:
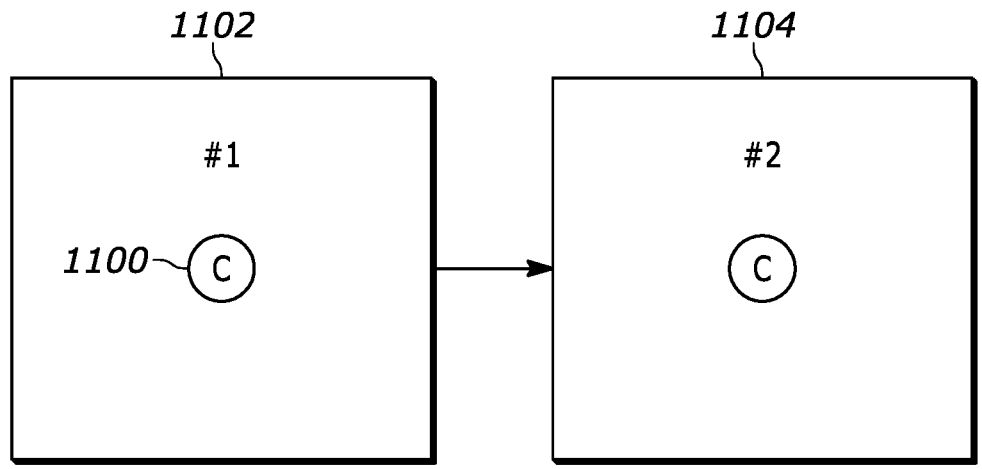

FIG. 11 illustrates that a local camera 1100 may be moved from the screen of a first local device 1102 to the screen of a second local device 1104. The camera 1100 may communicate via Wi-Fi or Bluetooth or other protocol with the devices 1102, 1104. Responsive to relocation of the camera 1100 from the first device 1102 to the second device 1104, either of the devices 1102, 1104, or indeed the camera itself may communicate with the remote device 306 in FIG. 3 to cause the remote device 306 to redirect its video feed from the first device 1102 to the second device 1104, with subsequent operation being consistent with the logic of FIG. 7.

Figure 12:
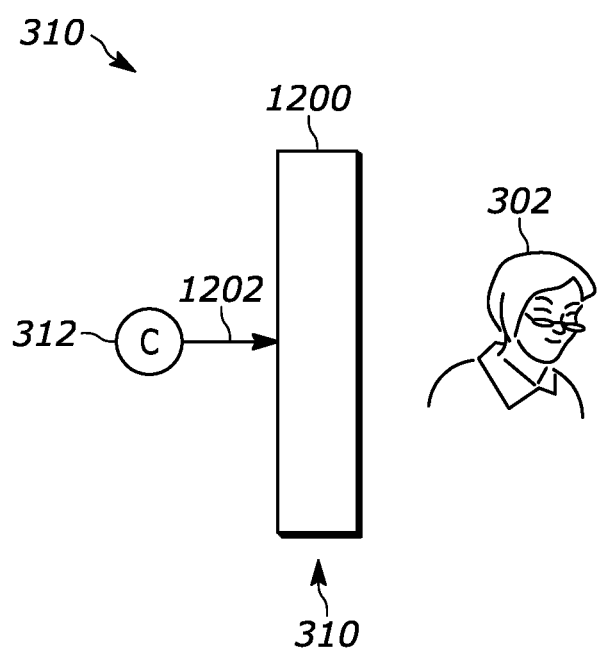

FIG. 12 illustrates an embodiment of the local device 310 in which the local device 310 includes an organic light emitting diode (OLED) screen 1200, behind which (relative to the local user 302) the local camera 312 may be mounted or even movably disposed so that the local device 310 may move it under using a motor and one or more tracks on which the camera 312 may move. The OLED screen 1200 may be made to be substantially transparent at the x-y location of the camera 312 so that the camera 312 may image the local user 302 through the screen 1200. This may be effected using a dynamically opacity-shifting film or other dynamic transparence technique. The camera 312 may also be used to image the user 302 during times at which the OLED is not presenting images based on the frame rate used by the OLED to present content (e.g., 60 Hz). Thus, in the example of FIG. 12 a VOI may be presented next to a screen location intersecting the imaging direction/axis 1202 of the camera 312, or the VOI may even be presented as overlapping that screen location (but possibly leaving a subset of that VOI screen area clear to allow for the camera 312 to have an unobscured view to user).

Figure 13:
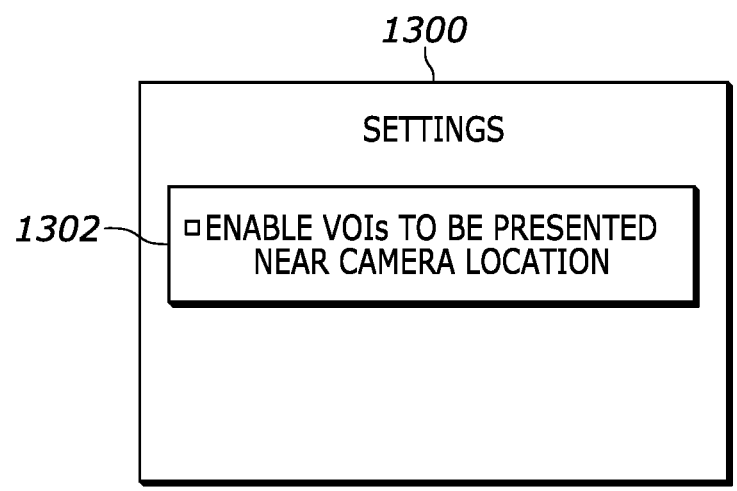
FIG. 13 is a screen shot of an example UI for configuring one or more settings of a device consistent with present principles.

Now in reference to FIG. 13, it shows an example UI 1300 that may be presented on the display of a device undertaking present principles, such as the local computer device 310. The UI 1300 may be presented for a user to configure one or more additional settings consistent with present principles. For example, the UI 1300 may include a first setting 1302 that is selectable via cursor or touch input to the adjacent check box to enable or configure the device to undertake present principles. For example, the setting 1302 may be selected to set the device to undertake the actions of the local computer 310 described above, execute the logic of FIGS. 7 and 8, electronically move the camera 902 of FIG. 9, perform other device actions described in relation to FIGS. 10-12, etc.

Figure 14:
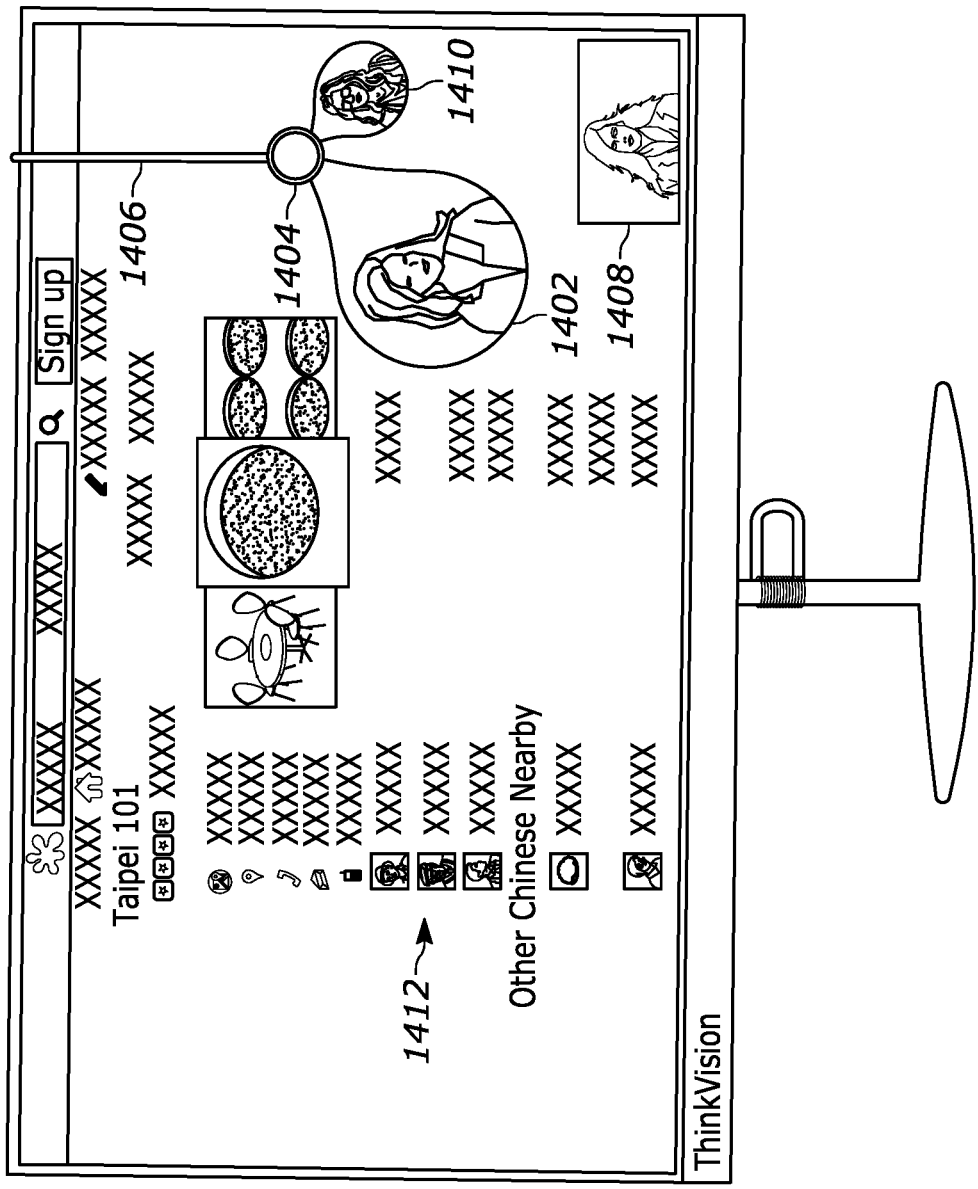
FIG. 14 is a screen shot of an example implementation.

FIG. 14 illustrates a screen 1400 presenting a video image 1402 of a remote user next to a camera 1404 that is suspended by an arm or cord 1406 from the top of the screen. An image 1408 of the local user is presented further away from the camera. A secondary image 1410 of another remote user also may be presented next to the camera. Additional information 1412 such as text, etc. is presented further away from the camera than the image 1402 of the remote user.

It is to be understood that whilst present principles have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device comprising:
   at least one processor; and
   storage accessible to the at least one processor and comprising instructions executable by the at least one processor to:
   present a user interface (UI) on a display screen, the UI being usable to configure one of more settings of the device, the UI comprising a first setting that is selectable to enable the device to subsequently perform plural respective identifications of coordinates of a camera relative to the display screen and to present respective video objects of interest (VOIs) in respective video streams next to the respective coordinates;
   identify first coordinates of the camera relative to the display screen; and
   responsive to identifying the first coordinates of the camera and based on the first setting being selected from the UI, present on the display screen a first VOI in a first video stream next to the first coordinates.

2. The device of claim 1, comprising the camera, the camera being coupled to the display screen.

3. The device of claim 2, wherein the camera is coupled to the display screen by a suction cup having a capacitive element detectable by the device to identify coordinates of the camera using touchscreen sensing.

4. The device of claim 2, wherein the camera is coupled to the display screen by a bezel of the display screen, and wherein the camera is moveable along the bezel using a motor controlled by the device.

5. The device of claim 2, wherein the camera is coupled to the display screen by an articulating arm, and wherein the camera is moveable via the articulating arm using a motor controlled by the device.

6. The device of claim 2, wherein the display screen is an organic light emitting diode (OLED) screen and the camera is mounted on a side of the display screen opposite a view side of the display screen, and wherein the instructions are executable to:
render at least part of the OLED transparent, and/or use an opacity-shifting film, to use the camera to generate images of the environment external to the device.

7. The device of claim 2, wherein the display screen is an organic light meeting diode (OLED) screen and the camera is mounted on a side of the display screen opposite a view side of the display screen, the camera being movable using a motor controlled by the device in order to move the camera at least next to the first coordinates.

8. The device of claim 2, wherein the camera is mounted on a side of the display screen opposite a view side of the display screen, and wherein the instructions are executable to:
control, based on a frame rate used by the display screen to present content, the camera to generate images of the environment external to the device during times at which the display screen is not presenting content.

9. The device of claim 3, wherein the capacitive element comprises a capacitive film.

10. The device of claim 3, wherein the instructions are executable to:
distinguish a touch signal from the capacitive element from a touch signal from a finger by identifying an annular pattern of a touch of the suction cup.

11. The device of claim 3, wherein the instructions are executable to:
distinguish a touch signal from the capacitive element from a touch signal from a finger by inferring a finger touch based on a touch lasting less than a threshold, and inferring suction cup placement based on a touch lasting more than the threshold.

12. The device of claim 1, wherein the instructions are executable to:
present on the display screen the first VOI and present on the display screen a second VOI, the first VOI being different from the second VOI;
determine at which of the first and second VOIs a user looks for more time; and
responsive to the determination, present the respective first or second VOI at which the user looks for more time next to the first coordinates.

13. A method, comprising:
identifying x-y coordinates of a camera imaging a local user relative to a local device;
receiving a first video stream from a remote computer, the first video stream comprising a first video object of interest (VOI);
presenting the first VOI on a screen of the local device and presenting a second VOI on the screen of the local device, the first VOI being different from the second VOI, the second VOI comprising something other than a video stream from a remote computer;
determining at which of the first and second VOIs the local user looks for more time; and
responsive to the determining, presenting the respective first or second VOI at which the local user looks for more time adjacent to the x-y coordinates on the screen of the local device.

14. The method of claim 13, wherein the second VOI comprises a document and/or menu.

15. The method of claim 13, wherein more time comprises a majority of the time during which both the first and second VOIs are presented on the screen.

16. A computer readable storage medium (CRSM) that is not a transitory signal, the computer readable storage medium comprising instructions executable by at least one processor to:
identify coordinates of a camera imaging a local user relative to a local device;
receive a first video stream from a remote computer, the first video stream comprising a first object of interest (OI);
present the first OI on a screen of the local device and present a second OI on the screen of the local device, the first OI being different from the second OI, the second OI comprising something other than a video stream from a remote computer;
determine at which of the first and second OIs the local user looks for more time; and
responsive to the determination, present the respective first or second OI at which the local user looks for more time adjacent to the coordinates on the screen of the local device.

17. The CRSM of claim 16, wherein the second OI comprises a document.

18. The CRSM of claim 16, wherein the second OI comprises a menu.

19. The CRSM of claim 16, wherein more time comprises a majority of the time during which both the first and second OIs are presented on the screen.

20. The CRSM of claim 16, wherein the instructions are executable to:
present a user interface (UI) on the screen, the UI being usable to configure one of more settings of the local device, the UI comprising a first setting that is selectable to enable the local device to subsequently present respective OIs in respective streams next to coordinates of the camera.

\* \* \* \* \*